(12) United States Patent
Peterson et al.

(10) Patent No.: US 7,617,501 B2
(45) Date of Patent: Nov. 10, 2009

(54) APPARATUS, SYSTEM, AND METHOD FOR MANAGING POLICIES ON A COMPUTER HAVING A FOREIGN OPERATING SYSTEM

(75) Inventors: Matthew T. Peterson, Lindon, UT (US); Daniel F. Peterson, Provo, UT (US)

(73) Assignee: Quest Software, Inc., Aliso Viejo, CA (US)

( * ) Notice: Subject to any disclaimer, the term of this patent is extended or adjusted under 35 U.S.C. 154(b) by 1060 days.

(21) Appl. No.: 10/888,845

(22) Filed: Jul. 9, 2004

(65) Prior Publication Data

US 2006/0010445 A1   Jan. 12, 2006

(51) Int. Cl.
*G06F 13/00* (2006.01)
(52) U.S. Cl. .................. 719/319; 709/201; 709/220; 709/223; 709/225
(58) Field of Classification Search ......... 709/200–253; 719/319
See application file for complete search history.

(56) References Cited

U.S. PATENT DOCUMENTS

| | | | | |
|---|---|---|---|---|
| 6,167,445 | A * | 12/2000 | Gai et al. | 709/223 |
| 6,170,009 | B1 * | 1/2001 | Mandal et al. | 709/223 |
| 6,839,766 | B1 * | 1/2005 | Parnafes et al. | 709/232 |
| 6,880,005 | B1 * | 4/2005 | Bell et al. | 709/225 |
| 7,185,073 | B1 * | 2/2007 | Gai et al. | 709/221 |
| 7,428,583 | B1 * | 9/2008 | Lortz et al. | 709/223 |
| 2003/0115313 | A1 * | 6/2003 | Kanada et al. | 709/223 |
| 2005/0091068 | A1 * | 4/2005 | Ramamoorthy et al. | 705/1 |

OTHER PUBLICATIONS

"Sun Enterprise Authentication Mechanism Data Sheet", http://wwws.sun.com/jsp_utils/Printpage.jsp?url, pp. 1-4.
"PADL Software Pty Ltd" http:// www.padl.com/products/XAD.html, pp. 1-3.
David "Del" Elson, Active Directory and Linux, http://www.securityfocus.com/printable/infocus/1563, pp. 1-11.
Apurva Kumar, "The OpenLDAP Proxy Cache", IBM, India Research Lab.
Antti Tikkanen, "Active Directory and nss_ldap for Linux: centralized user management", http://www.hut.fi/cc/docskerberos/nss_ldap/html, pp. 1-11.

(Continued)

*Primary Examiner*—Andy Ho
(74) *Attorney, Agent, or Firm*—Steve McDaniel; Utah Valley Patent

(57) ABSTRACT

An apparatus, system, and method are disclosed for managing policies on a computer having a foreign operating system. Policies may specify hardware or software configuration information. Policies on a first computer with a native operating system are translated into configuration information usable on a second computer having a foreign operating system. In an embodiment, a translator manager manages the association between the policy on the first computer and the translator on the second computer. Computer management complexity and information technology management costs are reduced by centralizing computer management on the native operating system. Further reductions in management complexity are realized when the present invention is used in conjunction with network directory services.

40 Claims, 7 Drawing Sheets

OTHER PUBLICATIONS

John Brezak, "Interoperability with Microsoft Windows 200 Active Directory and Kerberos Services", http://msdn.microsoft.com/library/en-us/dnactdir/html/kerberossamp.asp?frame=true, p. 1-4.

J. Brezak, "HTTP Authentication: SPNEGO Access Authentication As implemented in Microsoft Windows 2000", http://Meta.cesnet.cz/cms/opencms/en/docs/software/devel/draft-brezak-spnego-http-04.xt, p. 1-6.

"Sadma", http://sadmas.sourceforge.net/en/index/html, p. 1-2.

"Directory Administrator", http://diradmin.open-it.org/index/php, p. 1-3.

"Project: AD4Unix: Summary", http://sourceforge.net/projects/adunix/ p. 1-3.

"Lnux Authentication Against Active Directory", http://laaad/sourceforge.net/en/home/htm, p. 1-2.

"Kerberos Module for Apache" http://modauthkerb.sourceforge.net/.

"NegotiateAuth", http://negotiateauth.mozdev.org/.

Turbo Fredriksson,"LDAPv3", http://www.bayour.com/LDAPv3-HOWTO.html, p. 2-65.

"LDAP Linux HOWTO", http://tldo/org/HOWTO/LDAP-HOWTO/, p. 1-2.

"Sun Enterprise Authentication Mechanism Data Sheet", pp. 1-4, 2004.

"PADL Software Pty Ltd" pp. 1-3, 2004.

David "Del" Elson, Active Directory and Linux, pp. 1-11, 2002.

Antti Tikkanen, "Active Directory and nss_ldap for Linux: centralized user management", pp. 1-11, 2004.

John Brezak, "Interoperability with Microsoft Windows 200 Active Directory and Kerberos Service", p. 1-4, 2000.

Replacing NIS with Kerberos and LDAP, p. 1-2.

J. Brezak, "HTTP Authentication: SPNEGO Access Authentication As implemented in Microsoft Windows 2000", p. 1-6, 2000.

"Sadma", p. 1-2.

"Directory Administrator", p. 1-3.

"Project: AD4Unix: Summary", p. 1-3, 2004.

"Lnux Authentication Against Active Directory", p. 1-2.

"Kerberos Module for Apache".

"NegotiateAuth".

Turbo Fredriksson."LDAPv3", p. 2-65, 2001.

"LDAP Linux HOWTO", p. 1-2.

* cited by examiner

700

| Policy Template Data |
|---|
| CLASS MACHINE<br>CATEGORY "VAS"<br>   KEYNAME "SOFTWARE\Policies\VGP\VAS"<br>   CATEGORY "Users Allow and Deny"<br>     KEYNAME "SOFTWARE\Policies\VGP\VAS\UsersAllowDeny"<br>     POLICY "Modify Users Allow"<br>       KEYNAME "SOFTWARE\Policies\VGP\VAS\UsersAllowDeny"<br>       PART "Add user principal names, groups, or realms:" LISTBOX<br>         KEYNAME "SOFTWARE\Policies\VGP\VAS\UsersAllowDeny\Allow"<br>         VALUEPREFIX "Allow"<br>       END PART<br>     END POLICY    710 |

| Policy Manager Input Data |
|---|
| SOFTWARE\Policies\VGP\VAS\UsersAllowDeny\Allow;Allow1;1;james<br>SOFTWARE\Policies\VGP\VAS\UsersAllowDeny\Allow;Allow2;1;jill<br>SOFTWARE\Policies\VGP\VAS\UsersAllowDeny\Allow;Allow3;1;johnny    720 |

| Native Policy-related File Data |
|---|
| Preg....[.S.O.F.T.W.A.R.E.\.P.o.l.i.c.i.e.s.\.V.G.P.\.V.A.S.\.U.s.e.r.s.A.l.l.o.w.D.e.n.y.\<br>.A.l.l.o.w...;.A.l.l.o.w.1...;....;.j.a.m.e.s...].[.S.O.F.T.W.A.R.E.\.P.o.l.i.c.i.e.s.\.V.G.P.\.V.A.S.\<br>.U.s.e.r.s.A.l.l.o.w.D.e.n.y.\.A.l.l.o.w...;.A.l.l.o.w.1...;....;.j.i.l.l...].[.S.O.F.T.W.A.R.E.\.P.o.l.i.c.i.e.s.\<br>.V.G.P.\.V.A.S.\.U.s.e.r.s.A.l.l.o.w.D.e.n.y.\.A.l.l.o.w...;.A.l.l.o.w.1...;....;.j.o.h.n.n.y...]    730 |

| Translated Policy-related File Data |
|---|
| james<br>jill<br>johnny    740 |

FIG. 7 ved by currently available methods. Accordingly, the present invention has been developed to provide an apparatus, system, and method for managing policies on a computer having a foreign operating system that overcome many or all of the above-discussed shortcomings in the art.

APPARATUS, SYSTEM, AND METHOD FOR MANAGING POLICIES ON A COMPUTER HAVING A FOREIGN OPERATING SYSTEM

BACKGROUND OF THE INVENTION

1. Field of the Invention

This invention relates to managing groups of computers and more particularly relates to managing policies for configuring hardware or software settings on groups of computers with a plurality of operating systems.

2. Description of the Related Art

A major concern of information technology management in corporations and other organizations has been balancing the complexity associated with managing large numbers of computers with the needs of individual users as they try to accomplish their tasks. A heterogeneous set of computer hardware, operating systems, and application software creates complexity and increased costs, but various combinations of hardware, operating systems, and software provide technical advantages when used as user workstations, departmental servers, corporate infrastructure equipment, and the like. User workstations are particularly difficult to manage when various needs and preferences of individual users are accommodated. For example, an engineer may require the use of a CAD system that runs only on the UNIX™ operating system, where other corporate users may be standardized on the Microsoft Windows™ operating system and associated applications. Many similar compatibility issues exists among current computer systems.

One factor that adds to the complexity of managing various operating systems is that different operating systems employ different techniques for setting configuration information. For example, Microsoft Windows™ and applications that run on Windows typically use a database, called the registry, to store configuration information. Computers running the UNIX operating system or derivatives thereof such as LINUX typically store configuration information in plain text files in particular locations in the file system directory. Information technology managers within an organization that uses heterogeneous operating systems typically institute separate sets of management procedures and standards for each operating system used in the organization.

One component of prior art solutions to the problem of managing large numbers of computers and users is the use of policies. Policies are used to set configurable options associated with an operating system or application program for a group of computer users. For example, a word processing program may have an option to select an American English dictionary or a British English dictionary. By creating one policy for its users in the United States and another policy for its users in England, an organization can set the appropriate option for all users without configuring each user's computer individually.

Another component of prior art solutions to the problem of managing groups of computers and users is the use of network directory services. Directory services provide an infrastructure to store and access information about network-based entities, such as applications, files, printers, and people. Directory services provide a consistent way to name, describe, locate access, manage, and secure information about these resources. The directories associated with directory services are typically hierarchical structures such as a tree with each node in the hierarchy capable of storing information in a unit often referred to as a container. Enterprises may use directory servers and directory services to centrally manage data that is accessed from geographically dispersed locations.

For example, corporations typically create network directory trees that mirror their corporate organizations. Information about individual employees, such as their employee number, telephone number, and hire date may be stored in a user object corresponding to each user in the directory tree. An organizational unit container representing each department may contain the user objects associated with each employee in the department. Organizational unit objects associated with each corporate division may contain the department organizational unit objects associated with each department in the division. Finally, an organization container representing the corporation as a whole may contain the company's division organizational unit objects.

Combining the use of policies and directory services facilitates management of groups of computers and users. Policies may be associated with the various containers in the directory services tree to store associated configuration information at the organization, division, or departmental level. For example, a policy may be associated with the Accounts Receivable container in a corporate organization to set options for the accounting program used in that department. Exceptions to the policy can be managed on an individual level, or by creating a group object and associating a policy with the group. Suppose, for example, that all employees in an organization use a software application with a particular set of configuration options, but department managers require a different set of options. A policy could be created with the basic set of options and associated with the organization container. A separate policy with the configuration options for managers could be created and assigned to a Managers user group object.

Using policies and directory services in combination has proven efficient in homogeneous operating system environments. Prior art computer management systems use policies targeted toward a specific operating system, referred to as the native operating system. From the point of view of prior art policy and policy management systems, other operating systems are considered to be foreign operating systems. However, the operating requirements of many organizations require information technology managers to manage multiple operating systems. The efficiencies associated with policies and directory services have not been realized in heterogeneous operating system environments. Since different operating systems use different approaches to setting configuration information, a policy associated with a directory services container may be applied to users of a native operating system that provided the policies, but there may not be a method for applying the policy for users of a foreign operating system.

From the foregoing discussion, it should be apparent that a need exists for an apparatus, system, and method that extend the use of policies to manage configuration information on computers having operating systems that are foreign to the policy creation and management environment. Beneficially, such an apparatus, system, and method would control cost and complexity associated with management of computers with heterogeneous operating systems within an organization. The benefits are multiplied when network directory services are used in conjunction with policies.

SUMMARY OF THE INVENTION

The present invention has been developed in response to the present state of the art, and in particular, in response to the problems and needs in the art that have not yet been fully solved by currently available policy management systems. Accordingly, the present invention provides an apparatus, system, and method for managing policies on a computer having a foreign operating system that overcome many or all of the above-discussed shortcomings in the art.

In one aspect of the present invention, a method for managing policies on a computer having a foreign operating system includes providing a policy on a first computer with a native operating system, receiving the policy on a second computer with a foreign operating system, and translating the policy to configuration information usable on the second computer. In one embodiment, the method includes receiving the policy on the second computer at workstation start-up. The method also may include updating the policy at user login. These embodiments facilitate obtaining the current policy at the time they are typically needed by operating systems.

In further embodiments, the method includes polling the first computer at periodic intervals for changes to the policy. In these embodiments, configuration information usable on the second computer are updated to reflect changes in policy on the first computer, to keep the configuration information and policy closely synchronized. The method may also con include applying configuration information associated with directory services containers and objects. For example, a policy associated with a directory services organization container may be translated to configuration information that may then be applied to all users in the organization container.

In another aspect of the present invention, an apparatus to manage policies on a computer having a foreign operating system includes a policy on a first computer having a native operating system, a policy translator that translates the policy to configuration information usable on a second computer having foreign operating system, and a translator manager that manages the association between the policy on the first computer and the translator on the second computer. The apparatus, in one embodiment, is configured to manage configuration information usable on a second computer having a foreign operating system by means of policies on a first computer having a native operating system. A translator manager manages the association between the policy on the first computer, and a policy translator on the second computer.

The apparatus is further configured, in one embodiment, to include policies associated with network directory services containers and objects. Policies may be associated, for example, with organization containers, organizational unit containers, and user objects, facilitating the configuration of hardware or software information for groups of computer users at a corporate, department, or individual level.

Various elements of the present invention may be combined into a system arranged to carry out the functions or steps presented above. In one embodiment, the system includes two computers, the first having a native operating system and the second having a foreign operating system. In particular, the system, in one embodiment, includes a directory services server and database, a communications network, a policy, a policy editor, a policy template, a translator manager, and a policy translator.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 7 is a text diagram illustrating one embodiment of policy translation example data in accordance with the present invention.

DETAILED DESCRIPTION OF THE INVENTION

Figure 1:
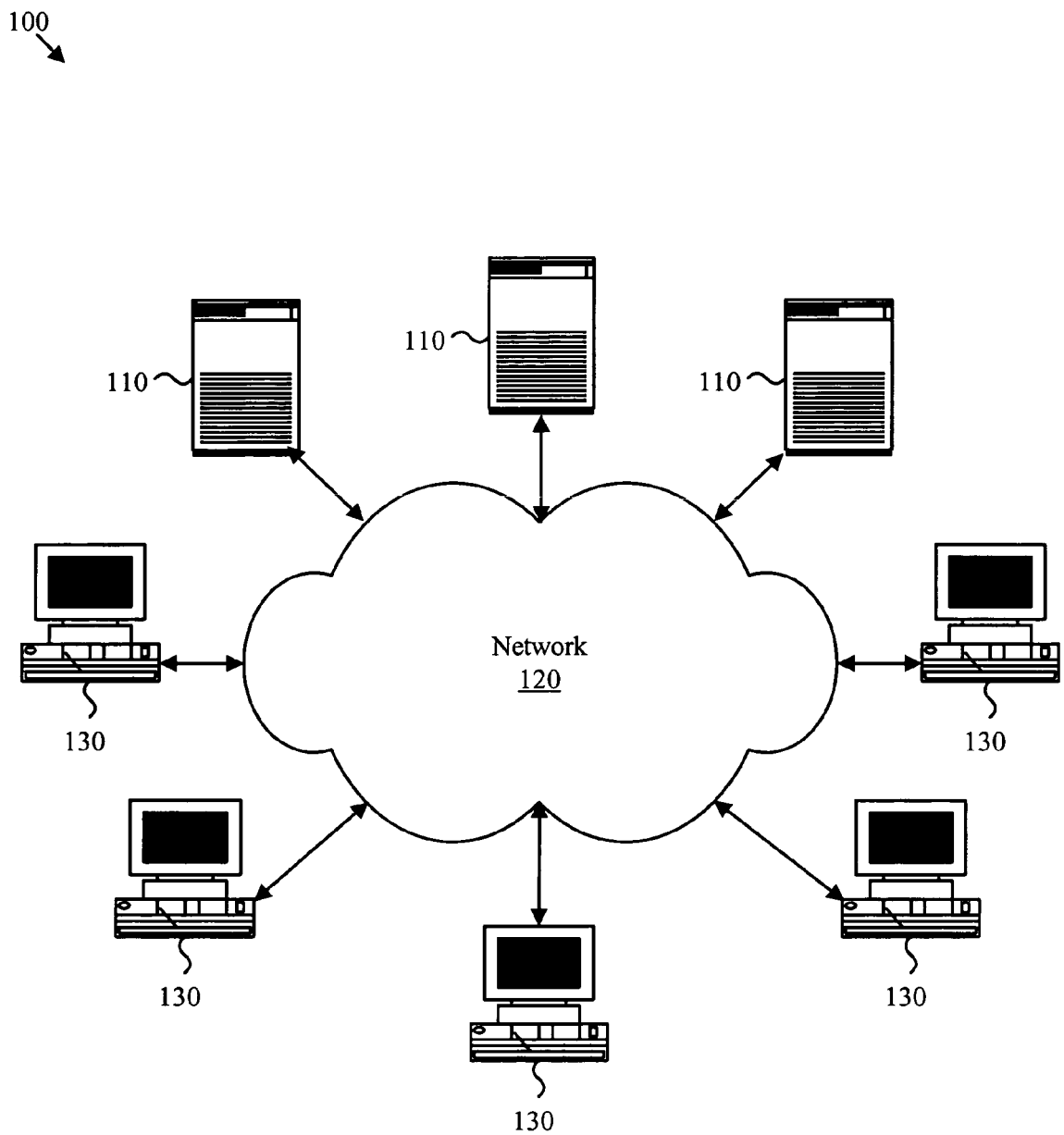
FIG. 1 is a schematic block diagram depicting one embodiment of a typical prior art networking environment wherein the present invention may be deployed.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 depicts one embodiment of a typical prior art networking environment 100 that demonstrates the issues regarding managing currently deployed enterprises. As depicted, the networking environment 100 includes one or more servers 110, a network 120, and one or more networked computers 130. The components of the networking environment 100 may reside at a single site or may be dispersed over multiple sites.

Some of the servers 110 may be directory servers or domain servers which can function as a registry for resources and users of the networking environment 100. The network 120 may include routers, bridges, hubs, gateways, or the like which facilitate communications among the components of the networking environment 100. Some of the networked computers 130 may execute legacy applications and operating systems that are unable to integrate with the servers 110 that are directory servers.

Some of the networked computers 130 may be used to run utility applications to manage the servers 110 that are directory servers and features of the directory service that runs on the servers 110. These networked computers 130 that manage the directory service typically do not include functionality to manage foreign operating systems that may run on other networked computers 130.

Figure 2:
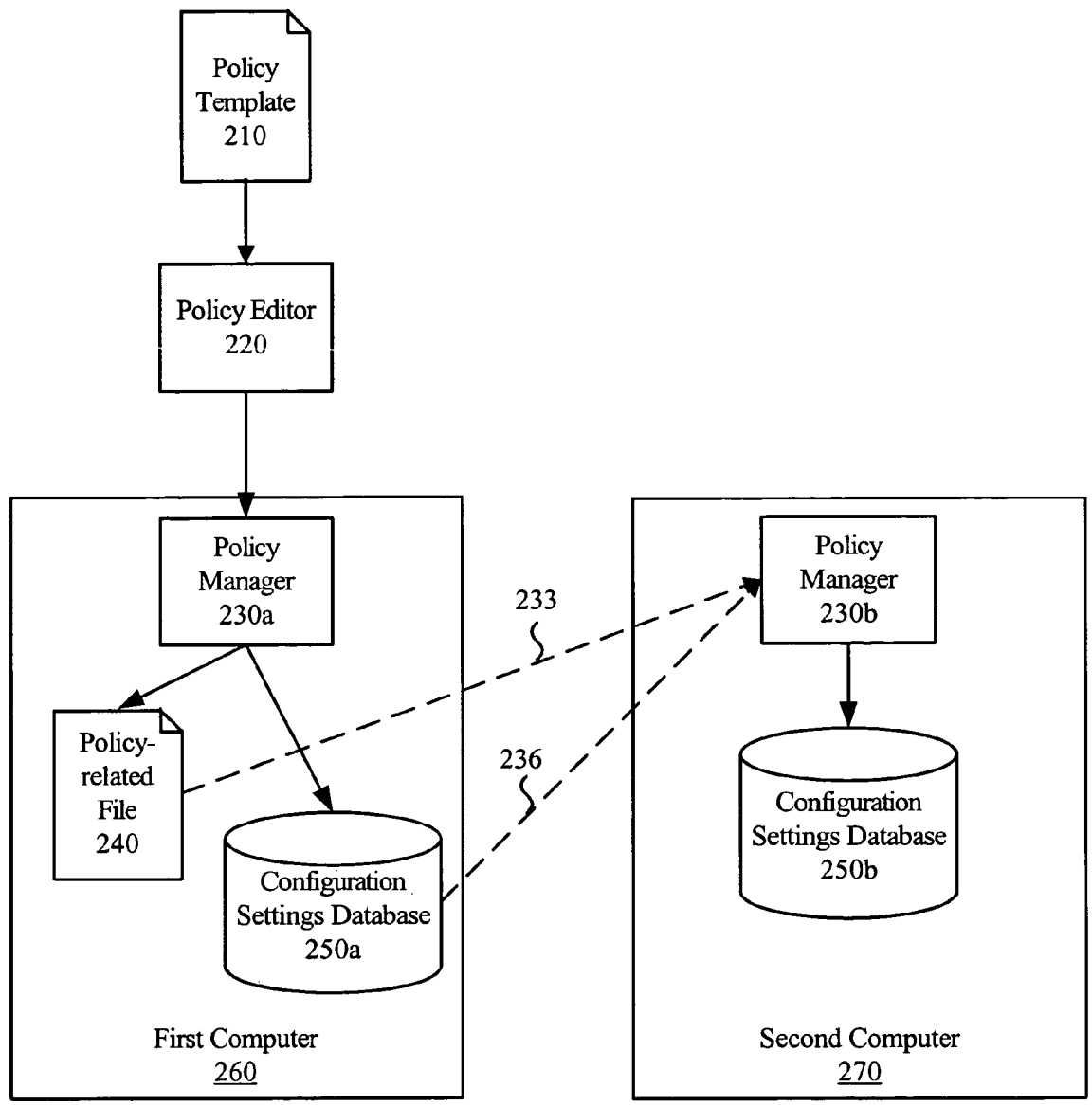
FIG. 2 is a schematic block diagram illustrating one embodiment of a prior art policy management apparatus.

FIG. 2 is a schematic block diagram illustrating one embodiment of a prior art policy management apparatus 200. The prior art policy management apparatus 200 includes a policy template 210, a policy editor 220, a first computer 260 having a native operating system, and a second computer 270 having the same native operating system. The first computer 260 includes a policy manager 230a, a policy-related file 240, and a configuration information database 250a. The second computer 270 includes a policy manager 230b, and a configuration information database 250b. This apparatus is configured to efficiently manage a group of computers having like operating systems.

An administrative user may use a policy template 210 and a policy editor 220 to control the operation of the policy manager 230a. The policy template 210 and the policy editor 220 may be located on the first computer 260 or may be on another computer. The policy manager 230a may use a policy-related file 240 and settings (i.e. information) in a configuration information database 250a to record the policy settings created by the administrative user.

As a means for efficiently managing a group of computers with like operating systems, a policy manager 230b in a second computer 270 may be configured to obtain policy settings by reading from the policy-related file 240 or the configuration information con database 250a on the first computer 260, as represented by the dashed lines 233 and 236 in FIG. 2. The policy manager 230b may then make settings to the configuration information database 250b on the second computer 270.

The policy may include configuration information that applies specifically to the second computer 270, or to a specific user or any of a group of users of the second computer 270. Configuration information may be associated with network directory services containers and objects. For example, by associating configuration information with an organizational unit container, the behavior of an application can be controlled for all users in a company department. Configuration information may be assigned to containers and objects at various levels in a directory services hierarchy, facilitating management of hardware and software configuration information at various organizational, geographical, or individual levels. For example, application configuration information may be associated with an organization container, organizational unit container, and user object in a network directory services hierarchy, resulting in application configuration options being assigned at corporate, departmental, and individual levels in an organization.

Figure 3:
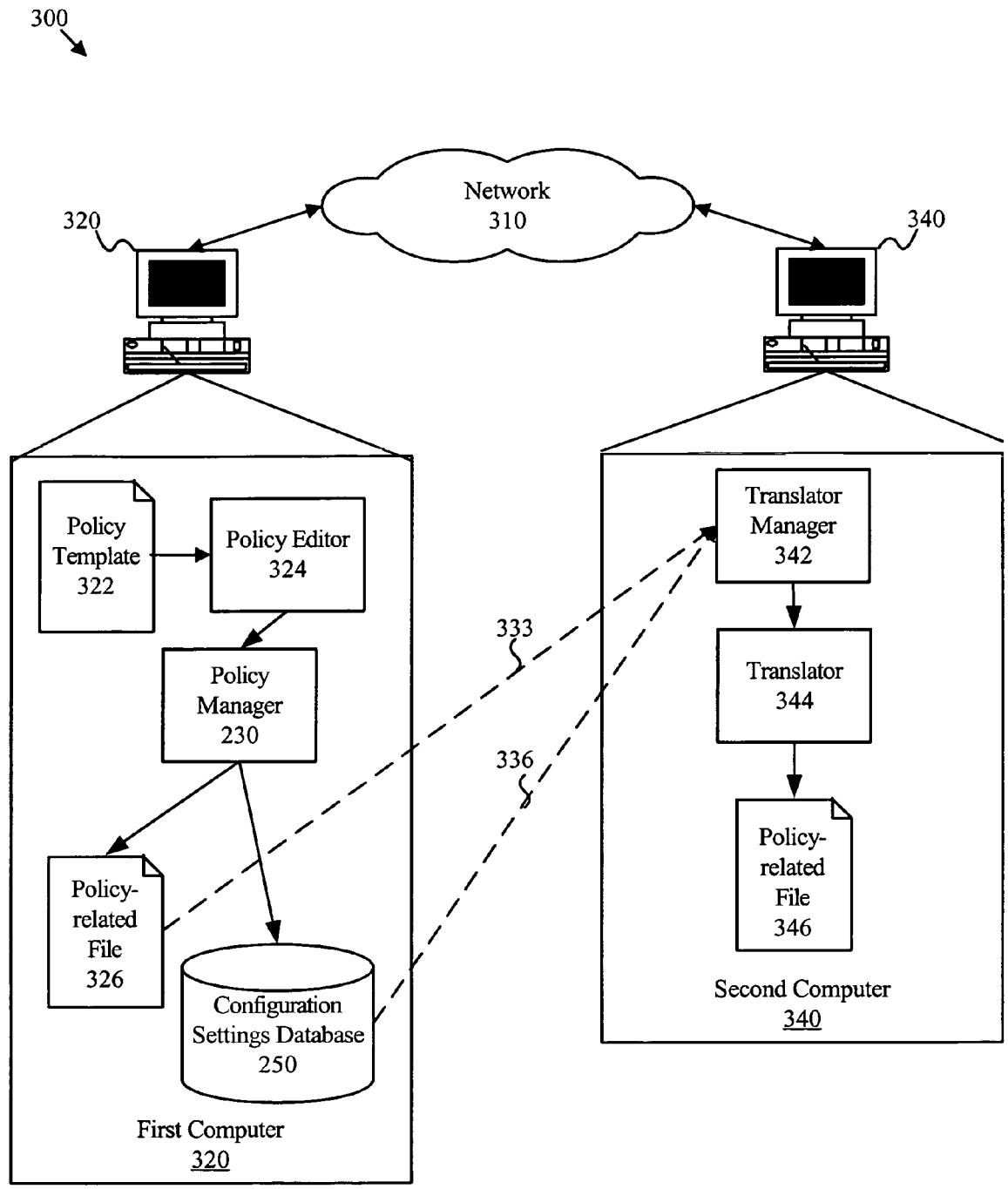
FIG. 3 is a schematic block diagram illustrating one embodiment of a policy management system in accordance with the present invention.

FIG. 3 is a schematic block diagram illustrating one embodiment of a policy management system 300 in accordance with the present invention. The depicted policy management system 300 includes a network 310, a first computer 320, and a second computer 340. The first computer 320 includes a policy template 322, a policy editor 324, a policy manager 230, a policy-related file 326, and a configuration information database 250. The depicted second computer 340 includes a translator manager 342, a translator 344, and a policy-related file 346. The policy management system 300 facilitates management of a group of computers with multiple operating systems by using the first computer 320 as a reference computer from which configuration information are replicated to other computers in a workgroup, or the like. The policy management system 300 depicted in FIG. 3 represents a peer-oriented embodiment of the present invention, where the first computer 320 and the second computer 340 are workstations, and no server is required.

An administrative user may use a policy template 322 and policy editor 324 to control the operation of the policy manager 230. The policy manager 230 may use a policy-related file 326 and settings or information in a configuration information database 250 to record the policy settings created by the administrative user. The translation manager 342 in the second computer 340 may be configured to obtain policy settings by reading from the policy-related file 326 and the configuration information database 250 on the first computer 320, as represented by the dashed lines 333 and 336 in FIG. 3. The translation manager 342 then passes the policy settings obtained from the first computer 320 to the translator 344 to translate to configuration information that may be stored in a policy-related file 346 on the second computer 340. In some embodiments, the translator 344 modifies configuration information stored in a plurality of files. The policy-related file 346 may not be exclusively dedicated to storing policy information. For example, the policy-related file 346 may contain non-policy data or code. In some embodiments, the operating system on the first computer 320 may provide an event notification system that notifies the translation manager 342 that changes have been made to the policy-related file 326 or the configuration information database 250.

Figure 4:
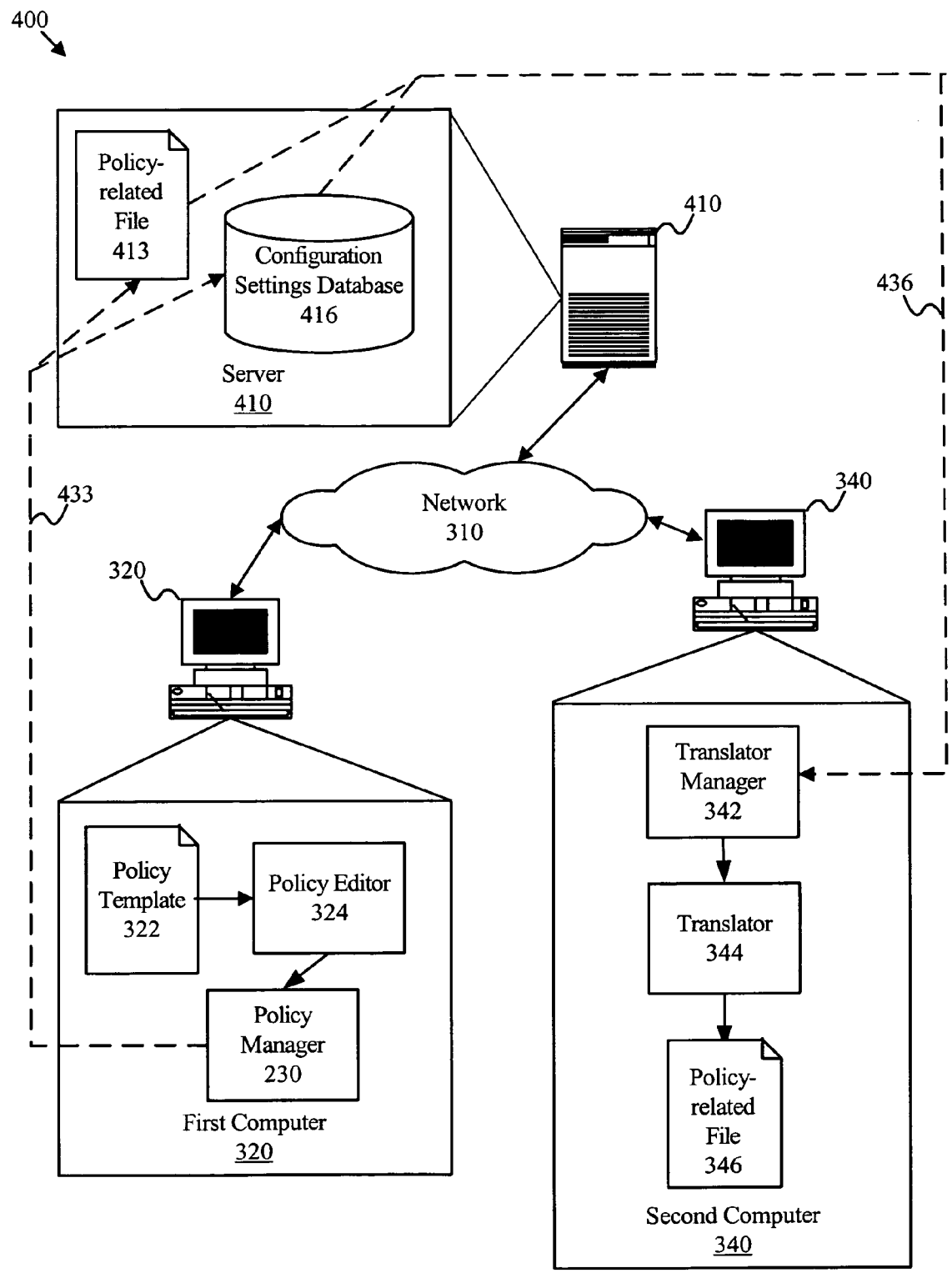
FIG. 4 is a schematic block diagram illustrating another embodiment of a policy management system in accordance with the present invention.

FIG. 4 is schematic block diagram illustrating another embodiment of a policy management system 400 in accordance with the present invention. The policy management system 400 includes a server 410, network 310, a first computer 320, and a second computer 340. The server 410 includes a policy-related file 413, and a configuration information database 416. The first computer 320 includes a policy template 322, a policy editor 324, and a policy manager 230. The second computer 340 includes a translation manager 342, a translator 344, and a policy-related file 346. The policy management system 400 facilitates management of a group of computers having multiple operating systems by replicating configuration information from a server 410, such as a directory server. The policy management system 400 depicted in FIG. 4 represents a client-server-oriented embodiment of the present invention, where configuration information are stored on a server 410 and replicated to client workstations represented by the second computer 340.

As with the embodiment depicted in FIG. 3, an administrative user may use a policy template 322 and policy editor 324 to control the operation of the policy manager 230. In this embodiment, however, the policy manager 230 may use a policy-related file 413 and settings in a configuration information database 416 to record the policy settings created by the administrative user on a server 410. The translation manager 342 in the second computer 340 may be configured to obtain policy settings by reading from the policy-related file 413 and the configuration information database 416 on the server 410, as represented by the dashed lines 433 and 436 in FIG. 4. The translation manager 342 then passes the policy settings obtained from the first computer 320 to the translator 344 to translate to configuration information that may be stored in a policy-related file 346 on the second computer 340.

The following schematic flow chart diagrams that follow are generally set forth as logical flow chart diagrams. As such, the depicted order and labeled steps are indicative of one embodiment of the presented method. Other steps, methods, and orderings may be conceived that are equivalent in function, logic, or effect to one or more steps, or portions thereof, of the illustrated method.

Figure 5:
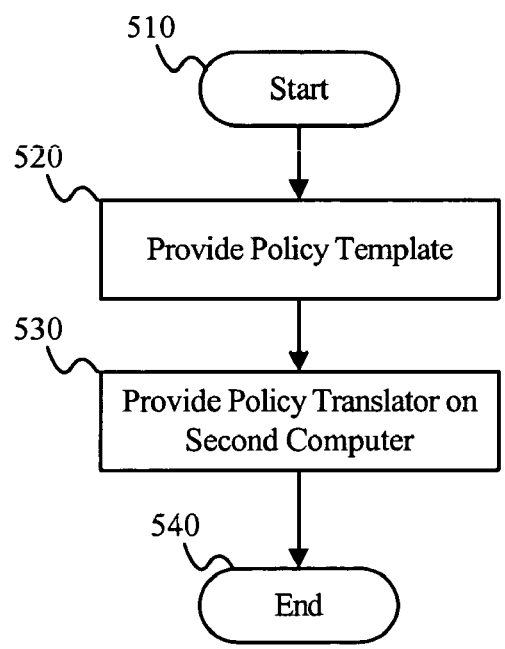
FIG. 5 is a schematic flow chart diagram illustrating one embodiment of a provide translator method in accordance with the present invention.

FIG. 5 is a schematic flow chart diagram illustrating one embodiment of a provide translator method 500 in accordance with the present invention. The provide translator method 500 includes a provide policy template step 520, and a provide policy translator step 530. The provide translator method 500 provides modules that facilitate translation of policy settings from a native operating system to a foreign operating system.

The provide policy template step 520 provides a policy template such as the policy template 322 to be used in conjunction with the policy editor 324, or the like. As detailed in FIG. 3 and elsewhere, the policy template 322 constrains policy editing, such that policies created by the policy editor 324 conform to requirements of the first computer 320. For example, the policy template 322 may ensure that configuration information car delivered to the policy manager 230 conform to a required syntax, or that numerical values fall within a meaningful range. The provide policy template step 520 may provide a plug-in module to an operating system utility program. In some embodiments, the provide policy template step 520 provides a wizard program module that guides a user through the process of creating a policy.

The provide policy translator step 530 provides a translator 344 that translates configuration information from the first computer 320 having a native operating system to the second computer 340 having a foreign operating system. The provide policy translator step 530 may place the translator 344 in a file system directory known to the translator manager 342. In some embodiments, the provide policy translator step 530 may register the file system location of the translator 344 with the translator manager 342. Upon completion of the provide policy translator step 530, the provide translator method 500 ends 540.

Figure 6:
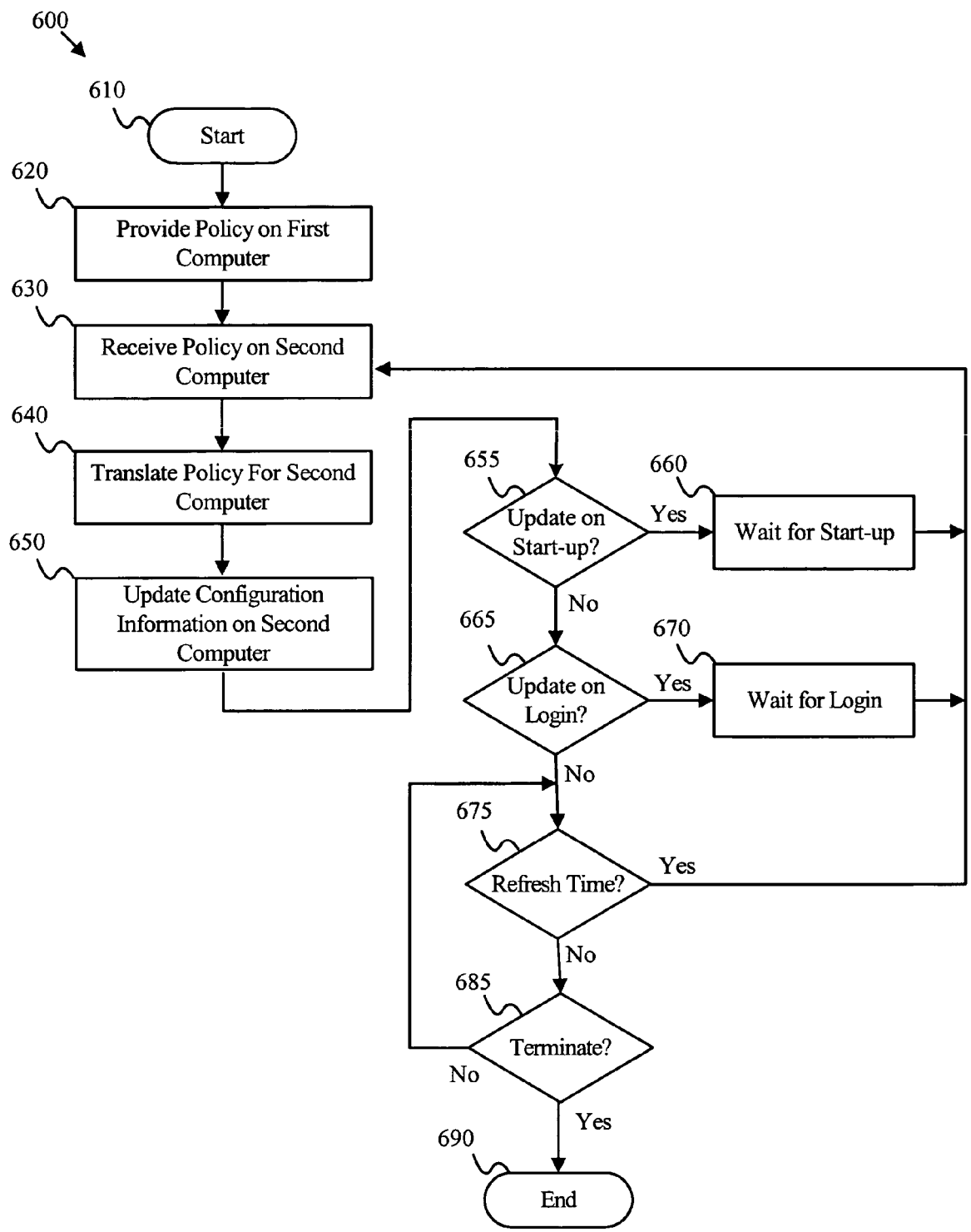
FIG. 6 is a schematic flow chart diagram illustrating one embodiment of a policy translation method in accordance with the present invention.

FIG. 6 is a schematic flow chart diagram illustrating one embodiment of a policy translation method 600 in accordance with the present invention. The policy translation method 600 includes a provide policy step 620, a receive policy step 630, a translate policy step 640, an update configuration step 650, an update on start-up test 655, a wait for start-up step 660, an update on login test 665, a wait for login step 670, a refresh time test 675, and a terminate test 685. The policy translation method 600 translates policies on a first computer 320 having a native operating system to policies for a second computer 340 having a foreign operating system.

The provide policy step 620 provides a policy on the first computer 320 having a native operating system. The provide policy step 620 may be performed by an administrative user using a policy template 322, policy editor 324, and/or policy manager 230. The policy may be contained in a policy-related file 326 and a configuration information database 250 on the first computer 320. In some embodiments, the policy may be contained in a policy-related file 413 and a configuration information database 416 on a server 410, such as a directory server.

The receive policy step 630 receives the policy on the second computer 340 having a foreign operating system. The receive policy step 630 may be performed by a translator manager 342 on the second computer 340. The translator manager 342 may copy the policy from a policy-related file 326 and a configuration information database 250 on the first computer 320. In other embodiments, the translator manager 342 may copy the policy from a policy-related file 413 and a configuration information database 416 on a server 410, such as a directory server. The translator manager 342 transmits the policy to a translator 344.

The translate policy step 640 translates configuration information from the first computer 320 having a native operating system to the second computer 340 having a foreign operating system. The translate policy step 740 may be performed by a translator 344 on the second computer 340. The translator 344 receives the policy from the translator manager 342 and translates the policy to foreign operating system configuration information used by the second computer 340.

The update configuration step 650 applies the configuration information translated by the translator 344. The update configuration step 650 may be performed by a translator 344 on the second computer 340 having a foreign operating system. After translating the policy to foreign operating system configuration information, the translator 344 applies the policy by saving the configuration information in a policy-related file 346. In some embodiments, configuration information may be saved in a plurality of policy-related files 346.

The update on start-up test 655 determines whether the policy is to be applied at workstation start-up. A policy may contain configuration information for all users of the second computer 340. Many operating systems apply configuration information at workstation start-up. Updating configuration information on the second computer 340 during workstation start-up makes the updated settings available for application during the workstation start-up process. If the policy is to be updated at workstation start-up, the policy translation method 600 continues with the wait for start-up step 660, otherwise the policy translation method 600 continues with the update on login test 665.

The wait for start-up step 660 waits for the second computer 340 to reach a point in the workstation start-up process where computer resources are available for the second computer 340 to receive the policy from the first computer 320. The wait for start-up step 660 includes setting a configuration setting that causes the policy translation method 600 to continue with the receive policy step 630 at workstation start-up. The wait for start-up step 660 facilitates receiving the current version of the policy so that configuration information may be applied to the second computer 340 at workstation start-up, when many operating systems typically read configuration information. Updating a policy at workstation start-up is particularly advantageous to workstation-specific configuration information.

The update on login test 665 determines whether the policy is to be applied at user login. A policy may contain configuration information that applies to a specific user or any of a group of users of the second computer 340. In some embodiments, configuration information may be associated with network directory services containers and objects. For example, by associating configuration information with an organizational unit container, the behavior of an application can be controlled for all users in a company department. Updating configuration information on the second computer 340 makes the current version of the settings available for application for the user logging in. If the policy is to be updated at user login, the policy translation method 600 continues with the wait for login method 670, otherwise the policy translation method 600 continues with the refresh time test 675.

The wait for login step 670 waits for a user to log in to the second computer 340 to receive the policy from the first computer 320. The wait for login step 670 includes setting a configuration setting that causes the policy translation method 700 to continue with the receive policy step 630 at user login. The wait for login step 670 facilitates receiving the current version of the policy so that configuration information may be applied to the second computer 340 at user login, when many operating systems typically read configuration information. Updating a policy at user login is particularly advantageous to user-specific configuration information.

The refresh time test 675 determines whether it is time to check for updates to the policy on the first computer 320. In some embodiments, the refresh time test 675 polls the first computer 320 at periodic intervals for changes to the policy. The polling interval may be configurable by the user or may itself be a setting configurable by a policy. In some embodiments, the refresh time test 675 may include a means for the first computer 320 to notify the second computer 340 that a change has been made to the policy, and that the policy should be refreshed on the second computer 340. If the refresh time has arrived, the policy translation method 600 continues with the receive policy step 630, otherwise it continues with the terminate test 685.

The terminate test 685 determines whether the refresh time test 675 should be repeated, or if the policy translation method 600 should terminate. In some embodiments, the policy translation method 600 may be terminated to facilitate deallocation of memory or other computer resources when the second computer 340 is shut down, or to allow for system maintenance. If the policy translation method is not to be terminated, it continues with the refresh time test 675, otherwise it ends 690.

FIG. 7 is a text diagram illustrating one embodiment of policy translation example data in accordance with the present invention. The policy translation example data 700 includes policy template data 710, policy manager input data 720, native policy-related file data 730, and translated policy-related file data 740. The policy translation example data may be generated in accordance with the policy translation method 600 and the policy management system 300.

The policy template data 710 is one example of the policy template 322. The policy template 322 may reside on the first computer 320 having a native operating system or on a third computer, such as an administrative workstation. The policy template data 710 may comprise plain ASCII text used to constrain data input accepted by the policy editor 324 by identifying names of data objects that the policy editor 324 will allow the user to edit. Policy template data 710 may also contain the text of prompts or other fields that control the user interface presented by the policy editor 324. Using the policy template 322, the policy editor 324 may accept input from an administrative user and generate input data for the policy manager 230.

Policy manager input data 720 illustrates the format of data that may be generated by the policy editor 324. In various embodiments, in accordance with the provide policy step 620, the policy manager 230 may accept the policy manager input data 720 from a file created by the policy editor 324, from a file created by an administrative user, or communicated directly from the policy editor 324 to the policy manager 230 via interprocess communication. The policy manager 230 may alter the format or contents of the policy manager input data 720. In some embodiments, the policy manager creates a policy-related file 326 and enters the location of the policy-related file 326 in the configuration settings database 250.

The native policy-related file data 730 is a textual representation of binary data in one embodiment of the policy-related file 326. The native policy-related file data 730 is generated by the policy manager 230, and in preparation for the receive policy step 630, is stored in a format and location typically used with the native operating system in use on the first computer 320. In the depicted embodiment, the native policy-related file data 730 comprises mixed binary and UNICODE text delimited by square brackets.

The translated policy-related file data 740 is one example of the policy-related file 346. In accordance with the translate policy step 640, the translator 344 translates the policy data received from the translator manager 342 to data usable by the foreign operating system used by the second computer 340. The depicted translated policy-related file data 740 is one example of a configuration file that a translator 344 has converted from mixed binary and UNICODE format to plain ASCII text format, and filtered to include only data usable by the foreign operating system in use on the second computer 340. In the depicted example, the translated policy-related file data 740 comprises a list of user names that will be allowed to log in to the second computer 340.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A signal bearing medium tangibly embodying a program of machine-readable instructions executable by a digital processing apparatus to perform operations to manage policies on a computer having a foreign operating system, the operations comprising:

receiving a policy on a second computer having a foreign operating system, the policy constructed on a first computer having a native operating system according to a policy standard developed for, and utilized by, the native operating system, and wherein the foreign operating system does not directly utilize the policy standard developed for, and utilized by, the native operating system; and executing a translator on the second computer, the translator configured to execute under the foreign operating system and translate the policy from the policy standard developed for, and utilized by, the native operating system to configuration information usable by the foreign operating system.

2. The signal bearing medium of claim 1, wherein the native operating system is Windows™.

3. The signal bearing medium of claim 1, wherein the foreign operating system is UNIX™ or a derivative thereof.

4. The signal bearing medium of claim 1, further comprising updating selected information on the second computer with the configuration information.

5. The signal bearing medium of claim 4, wherein updating selected information on the second computer comprises updating workstation-specific configuration information.

6. The signal bearing medium of claim 4, wherein updating selected information occurs in response to workstation startup.

7. The signal bearing medium of claim 4, wherein updating selected information on the second computer further comprises updating user-specific configuration information.

8. The signal bearing medium of claim 7, wherein the user-specific configuration information comprises configuration information selected from the group consisting of organization information, organizational unit information, organizational role information, group information, domain information, domain controller information, country information, locality information, state or province information, site information, profile information, user object information, template information, and alias information.

9. The signal bearing medium of claim 4, wherein setting user-specific configuration information further comprises establishing a precedence of user-specific configuration information.

10. The signal bearing medium of claim 4, wherein updating the selected information occurs in response to user login.

11. The signal bearing medium of claim 1, further comprising editing a policy on the first computer.

12. The signal bearing medium of claim 1, further comprising providing a policy template configured to constrain policy editing on the first computer.

13. The signal bearing medium of claim 1, further comprising registering a plurality of translators on the second computer corresponding to a plurality of policies on the first computer.

14. The signal bearing medium of claim 13, wherein registering the plurality of translators comprises placing the translators in a file system directory.

15. The signal bearing medium of claim 1, further comprising polling a translator to identify configuration information to be translated.

16. The signal bearing medium of claim 15, wherein the polling is conducted at periodic time intervals.

17. The signal bearing medium of claim 1, further comprising polling the first computer to identify modifications to the policy.

18. The signal bearing medium of claim 17, wherein the polling is conducted at periodic time intervals.

19. An apparatus to manage policies on a computer having a foreign operating system, the apparatus comprising:

a policy translator configured to receive a policy on a second computer having a foreign operating system, the policy constructed on a first computer having a native operating system according to a policy standard developed for, and utilized by, the native operating system;

the policy translator further configured to execute under the foreign operating system and translate the policy from the policy standard developed for, and utilized by, the native operating system to configuration information usable by the foreign operating system; and a translator manager configured to manage the association between the policy on the first computer and the translator on the second computer.

20. The apparatus of claim 19, wherein the policy is a group policy.

21. The apparatus of claim 19, wherein the native operating system is Windows™ and the foreign operating system is UNIX™ or a derivative thereof.

22. The apparatus of claim 21, wherein the policy is further configured to pertain to a plurality of computer workstations referenced in a directory services container.

23. The apparatus of claim 19, wherein the policy is further configured to pertain to a user.

24. The apparatus of claim 19, wherein the policy is further configured to comprise configuration information selected from the group consisting of organization information, organizational unit information, organizational role information, group information, domain information, domain controller information, country information, locality information, locality information, site information, profile information, user object information, template information, and alias information.

25. The apparatus of claim 19, further comprising at least one policy on the first computer, each policy thereof corresponding to a policy translator on the second computer.

26. The apparatus of claim 19, further comprising a policy editor configured to facilitate creation and editing of policies.

27. The apparatus of claim 19, further comprising a policy template configured to constrain creation and editing of policies.

28. The apparatus of claim 19, wherein the translator manager is further configured to execute the translator in response to the translator manager beginning execution.

29. The apparatus of claim 19, wherein the translator manager is further configured to execute the translator in response to user login.

30. The apparatus of claim 19, wherein the translator manager is further configured to poll the first computer for modifications to the policy.

31. An apparatus to manage policies on a computer having a foreign operating system, the apparatus comprising:
   means for receiving a policy on a second computer having a foreign operating system, the policy constructed on a first computer having a native operating system according to a policy standard developed for, and utilized by, the native operating system, and wherein the foreign operating system does not directly utilize the policy standard developed for, and utilized by, the native operating system; and
   means for translating the policy under the foreign operating system from the policy standard developed for, and utilized by, the native operating system to configuration information usable by the foreign operating system.

32. The apparatus of claim 31, further comprising means for providing a policy template configured to constrain policy editing on the first computer.

33. The apparatus of claim 31, further comprising means for updating selected information on the second computer with the configuration information.

34. A system to manage policies on a computer having a foreign operating system, the system comprising:
   a first computer having a native operating system;
   a second computer having a foreign operating system;
   a directory services database;
   a communications network configured to facilitate communications between computers and computer peripherals;
   a policy translator configured to execute under the foreign operating system and translate the policy from a policy standard developed for, and utilized by, the native operating system to configuration information useable by the foreign operating system;
   a translator manager configured to manage the association between the policy on the first computer and the translator on the second computer.

35. The system of claim 34, the system further comprising a policy editor configured to facilitate creation and editing of polices.

36. The system of claim 34, the system further comprising a policy template configured to constrain creation and editing of policies.

37. The system of claim 34 wherein the directory services database resides on the first computer.

38. A method to manage policies on a computer having a foreign operating system, the method comprising:
   receiving a policy on a second computer having a foreign operating system, the policy constructed on a first computer having a native operating system according to a policy standard developed for, and utilized by, the native operating system; and
   executing a translator on the second computer, the translator configured to execute under the foreign operating system and translate the policy from the policy standard developed for, and utilized by, the native operating system to configuration information usable by the foreign operating system.

39. The method of claim 38, further comprising providing a policy template configured to constrain policy editing on the first computer.

40. The method of claim 38, further comprising updating selected information on the second computer with the configuration information.

* * * * *

UNITED STATES PATENT AND TRADEMARK OFFICE
CERTIFICATE OF CORRECTION

PATENT NO. : 7,617,501 C2  
APPLICATION NO. : 90/013196  
DATED : June 8, 2015  
INVENTOR(S) : Peterson et al.

Page 1 of 1

It is certified that error appears in the above-identified patent and that said Letters Patent is hereby corrected as shown below:

Title Page, Item (10) "US 7,617,501 C1" should read --US 7,617,501 C2--.

Signed and Sealed this
Twenty-ninth Day of September, 2015

Michelle K. Lee
*Director of the United States Patent and Trademark Office*

(12) INTER PARTES REEXAMINATION CERTIFICATE (1065th)
United States Patent
Peterson et al.

(10) Number: US 7,617,501 C1
(45) Certificate Issued: Mar. 13, 2015

(54) APPARATUS, SYSTEM, AND METHOD FOR MANAGING POLICIES ON A COMPUTER HAVING A FOREIGN OPERATING SYSTEM

(75) Inventors: Matthew T. Peterson, Lindon, UT (US); Daniel F. Peterson, Provo, UT (US)

(73) Assignee: Quest Software, Inc., Aliso Viejo, CA (US)

Reexamination Request:
No. 95/001,458, Sep. 30, 2010

Reexamination Certificate for:
Patent No.: 7,617,501
Issued: Nov. 10, 2009
Appl. No.: 10/888,845
Filed: Jul. 9, 2004

(51) Int. Cl.
*G06F 13/00* (2006.01)
*H04L 12/24* (2006.01)
*G06F 21/62* (2013.01)

(52) U.S. Cl.
CPC ........ *H04L 41/0893* (2013.01); *G06F 21/6236* (2013.01); *H04L 41/0866* (2013.01)
USPC ........... 719/319; 709/201; 709/220; 709/223; 709/225

(58) Field of Classification Search
None
See application file for complete search history.

(56) References Cited

To view the complete listing of prior art documents cited during the proceeding for Reexamination Control Number 95/001,458, please refer to the USPTO's public Patent Application Information Retrieval (PAIR) system under the Display References tab.

*Primary Examiner* — Minh Dieu Nguyen

(57) ABSTRACT

An apparatus, system, and method are disclosed for managing policies on a computer having a foreign operating system. Policies may specify hardware or software configuration information. Policies on a first computer with a native operating system are translated into configuration information usable on a second computer having a foreign operating system. In an embodiment, a translator manager manages the association between the policy on the first computer and the translator on the second computer. Computer management complexity and information technology management costs are reduced by centralizing computer management on the native operating system. Further reductions in management complexity are realized when the present invention is used in conjunction with network directory services.

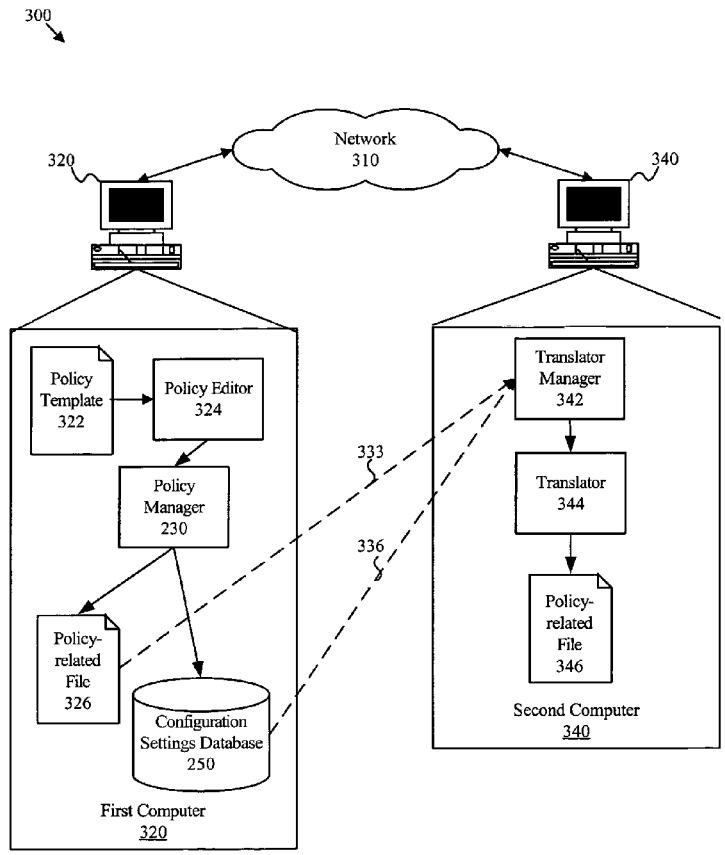

INTER PARTES REEXAMINATION CERTIFICATE ISSUED UNDER 35 U.S.C. 316

NO AMENDMENTS HAVE BEEN MADE TO THE PATENT

AS A RESULT OF REEXAMINATION, IT HAS BEEN DETERMINED THAT:

The patentability of claims 1-40 is confirmed.

\* \* \* \* \*

(12) EX PARTE REEXAMINATION CERTIFICATE (10621st)
United States Patent
Peterson et al.

(10) Number: US 7,617,501 C1
(45) Certificate Issued: Jun. 8, 2015

(54) APPARATUS, SYSTEM, AND METHOD FOR MANAGING POLICIES ON A COMPUTER HAVING A FOREIGN OPERATING SYSTEM

(75) Inventors: Matthew T. Peterson, Lindon, UT (US); Daniel F. Peterson, Provo, UT (US)

(73) Assignee: BANK OF AMERICA, N.A., Charlotte, NC (US)

Reexamination Request:
No. 90/013,196, Mar. 31, 2014

Reexamination Certificate for:
Patent No.: 7,617,501
Issued: Nov. 10, 2009
Appl. No.: 10/888,845
Filed: Jul. 9, 2004

(51) Int. Cl.
*G06F 13/00* (2006.01)
*G06F 9/54* (2006.01)
*H04L 29/08* (2006.01)

(52) U.S. Cl.
CPC .......... *G06F 9/541* (2013.01); *H04L 29/08072* (2013.01)

(58) Field of Classification Search
None
See application file for complete search history.

(56) References Cited

To view the complete listing of prior art documents cited during the proceeding for Reexamination Control Number 90/013,196, please refer to the USPTO's public Patent Application Information Retrieval (PAIR) system under the Display References tab.

*Primary Examiner* — Christopher E Lee

(57) ABSTRACT

An apparatus, system, and method are disclosed for managing policies on a computer having a foreign operating system. Policies may specify hardware or software configuration information. Policies on a first computer with a native operating system are translated into configuration information usable on a second computer having a foreign operating system. In an embodiment, a translator manager manages the association between the policy on the first computer and the translator on the second computer. Computer management complexity and information technology management costs are reduced by centralizing computer management on the native operating system. Further reductions in management complexity are realized when the present invention is used in conjunction with network directory services.

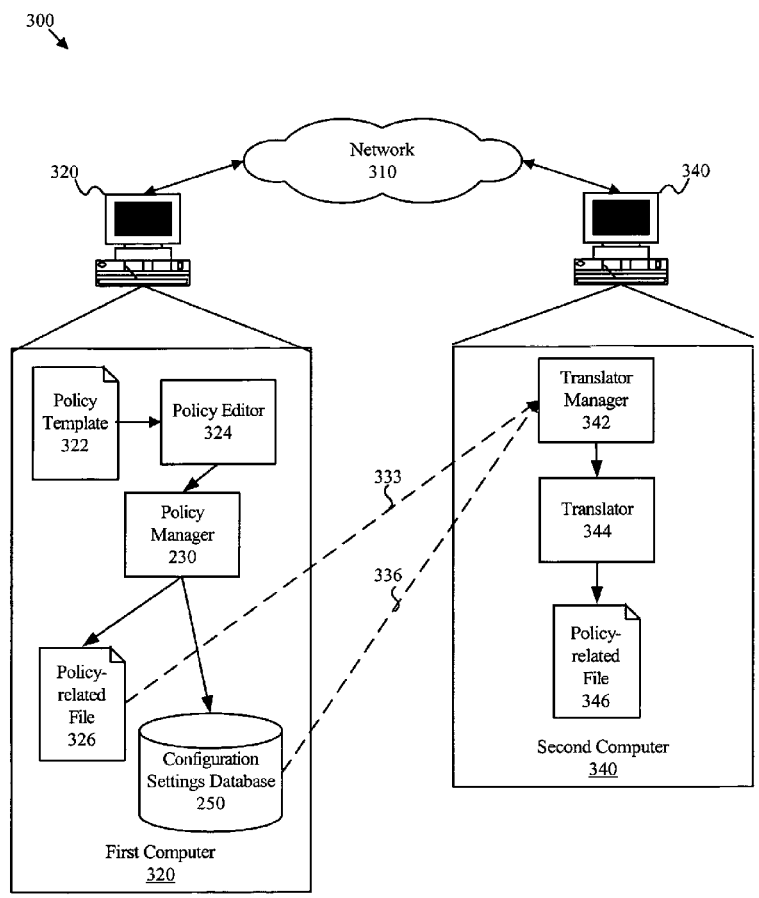

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 17 and 30-40 are cancelled.

Claims 1, 18 and 19 are determined to be patentable as amended.

Claims 2-16 and 20-29, dependent on an amended claim, are determined to be patentable.

1. A signal bearing medium tangibly embodying a program of machine-readable instructions executable by a digital processing apparatus to perform operations to manage policies on a computer having a foreign operating system, the operations comprising:
   receiving a policy on a second computer having a foreign operating system, the policy constructed on a first computer having a native operating system according to a policy standard developed for, and utilized by, the native operating system, and wherein the foreign operating system does not directly utilize the policy standard developed for, and utilized by, the native operating system; [and]
   executing a translator on the second computer, the translator configured to execute under the foreign operating system and translate the policy from the policy standard developed for, and utilized by, the native operating system to configuration information usable by the foreign operating system; *and*
   *polling the first computer to identify modifications to the policy.*

18. The signal bearing medium of claim [17] *1*, wherein the polling is conducted at periodic time intervals.

19. An apparatus to manage policies on a computer having a foreign operating system, the apparatus comprising:
    a policy translator configured to receive a policy on a second computer having a foreign operating system, the policy constructed on a first computer having a native operating system according to a policy standard developed for, and utilized by, the native operating system;
    the policy translator further configured to execute under the foreign operating system and translate the policy from the policy standard developed for, and utilized by, the native operating system to configuration information usable by the foreign operating system; and
    a translator manager configured to manage the association between the policy on the first computer and the translator on the second computer, *wherein the translator manager is further configured to poll the first computer for modifications to the policy*.

* * * * *